United States Patent
Ozawa et al.

(10) Patent No.: US 11,138,483 B2
(45) Date of Patent: Oct. 5, 2021

(54) SYSTEM AND METHOD FOR READING AN INFORMATION CODE

(71) Applicant: DENSO WAVE INCORPORATED, Chita-gun (JP)

(72) Inventors: Ryo Ozawa, Chita-gun (JP); Kenichi Yoshida, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 0 days.

(21) Appl. No.: 16/644,599

(22) PCT Filed: Sep. 4, 2018

(86) PCT No.: PCT/JP2018/032758
§ 371 (c)(1),
(2) Date: Mar. 5, 2020

(87) PCT Pub. No.: WO2019/049863
PCT Pub. Date: Mar. 14, 2019

(65) Prior Publication Data
US 2020/0387764 A1    Dec. 10, 2020

(30) Foreign Application Priority Data
Sep. 5, 2017 (JP) .............................. JP2017-170460

(51) Int. Cl.
*G06K 7/10* (2006.01)
*G06K 19/06* (2006.01)
(Continued)

(52) U.S. Cl.
CPC . *G06K 19/06131* (2013.01); *G06K 19/06037* (2013.01); *G06K 19/0717* (2013.01);
(Continued)

(58) Field of Classification Search
CPC ............................................ G06K 2019/06262
See application file for complete search history.

(56) References Cited

U.S. PATENT DOCUMENTS 9,672,458 B2 *  6/2017  Burkhart .............. G06K 7/1404
2010/0078482 A1    4/2010  Bradford
(Continued)

FOREIGN PATENT DOCUMENTS

JP    2011-165154 A    8/2011
JP    2017-091450 A    5/2017

OTHER PUBLICATIONS

Nov. 20, 2018 International Search Report issued in International Patent Application No. PCT/JP2018/032758.

*Primary Examiner* — Thien M Le
*Assistant Examiner* — April A Taylor
(74) *Attorney, Agent, or Firm* — Oliff PLC

(57) ABSTRACT

In a system, mobile terminal and a reader are communicable with each other. In the mobile terminal, a terminal tilt state is detected by a detecting unit as a terminal environmental state, an information code is generated such that the detected terminal environmental state and predetermined information are recorded in the information code, and the generated information code is displayed on the screen of a display unit. In the reader, a reading surface tilt state corresponding to the terminal environmental state is detected by a detecting unit as a reading surface environmental state. When the reader reads the information code and the detected reading surface environmental state and the detected terminal environmental state show the same environmental state, the read predetermined information is used by a control unit to perform processing based on the predetermined information.

13 Claims, 12 Drawing Sheets

(51) Int. Cl.
*G06K 19/07* (2006.01)
*G06K 19/077* (2006.01)

(52) U.S. Cl.
CPC ............... *G06K 19/07703* (2013.01); *G06K 2019/06262* (2013.01)

(56) References Cited

U.S. PATENT DOCUMENTS

2011/0073647 A1 3/2011 Chiou
2017/0193260 A1 7/2017 Prusik et al.
2017/0372260 A1 12/2017 Desmarais et al.
2018/0005222 A1* 1/2018 Kameyama .......... G06Q 20/204

* cited by examiner

SYSTEM AND METHOD FOR READING AN INFORMATION CODE

CROSS-REFERENCE TO RELATED APPLICATION

This application is based on and claims the benefit of priority from earlier Japanese Patent Application No. 2017-170460 filed on Sep. 5, 2017 the description of which is incorporated herein by reference.

BACKGROUND

Technical Field

The present invention relates to a system and a method for reading an information code. More specifically, the present invention relates to a system having a configuration in which an information code generated by a mobile terminal is read by a reader, and a method that can be implemented by the system.

Related Art

Information codes such as bar codes and QR codes (registered trademark) are currently used for various applications, and the purposes of use have been diversified. In particular, there have been increasing needs for authenticity determination based on information codes. Accordingly, in order to improve accuracy in authenticity determination, prevention of duplication of information codes and prevention of unauthorized use of the duplicated information code have been strongly demanded.

An example of techniques for the authenticity determination using an information code is disclosed as a product authentication system in JP 2017-091450 A. In this product authentication system, a product authentication tag that displays a QR code and a first identification code is affixed to a product such that a request for product authentication is performed by transmitting a reading result of the QR code that has been read by the mobile information terminal and the first identification code that has been inputted to an authentication server. Then, the authentication server refers to the database, and determines as 'genuine when both the QR code and the first identification code match, and the first identification code is updated to a second identification code in the database, and the updated second identification code is transmitted to the mobile information terminal. Accordingly, only the purchaser who has first made the request for product authentication can use the updated second identification code to perform product authentication, whereas a third party cannot obtain the updated second identification code and thus cannot perform product authentication.

CITATION LIST

Patent Literature

[PTL 1] JP 2017-091450 A

In the above system configuration, however, communication is required between the mobile information terminal that functions as a reader for reading an information code and the server. As a consequence, there is a problem that the above system configuration cannot be adopted for a system that uses a reader which can be positioned in an environment that cannot communicate with an external device such as a server.

SUMMARY

It is thus desired to provide a configuration capable of preventing unauthorized use of a duplicated information code without requiring communication with an external device such as a server.

In order to realize the forgoing object, a first exemplary embodiment relates to an information code reading system comprising a mobile terminal provided with a screen and a reader which acquires predetermined information by optically reading an information code displayed on the screen of the mobile terminal, characterized in that the mobile terminal comprises a terminal-side detecting unit detecting, as a terminal environmental state, at least one of a state of the mobile terminal and a state around the mobile terminal;

a generation unit generating the information code, the terminal environmental state, detected by the terminal-side detecting unit, and the predetermined information being recorded in the information code; and a display unit displaying the information code generated by the generation unit, and the reader comprises:

an imaging unit provided with a reading surface and configured to image the information code held over the reading surface, a reading unit reading both the terminal environmental state and the predetermined information from the information code imaged by the imaging unit;

a reader-side detecting unit detecting a reading surface environmental state corresponding to the terminal environmental state among the state of the reading surface and the state around the reading surface;

a determination unit determining whether or not both the reading surface environmental state detected by the reader-side detecting unit and the terminal environmental state read by the reading unit indicate the same environmental state when the reading unit reads the information code; and a processing unit performing processing based on the predetermined information read by the reading unit when the determination unit determines that the reading surface environmental state and the terminal environmental state indicate the same environmental state.

A second exemplary embodiment relates to an information code reading system comprising a mobile terminal provided with a screen and a reader which acquires predetermined information by optically reading an information code displayed on the screen of the mobile terminal, characterized in that the mobile terminal comprises a terminal-side detecting unit detecting a tilt state of the mobile terminal relative to a horizontal plane;

a generation unit generating the information code, the tilt state of the mobile terminal, detected by the terminal-side detecting unit, and the predetermined information being recorded in the information code; and a display unit displaying the information code generated by the generation unit, and the reader comprises:

an imaging unit provided with a reading surface and configured to image the information code held over the reading surface, a reading unit reading both the tilt state of the mobile terminal and the predetermined information from the information code imaged by the imaging unit;

a storage unit, a tilt state of the reading surface relative to the horizontal plane being previously stored in the storage unit;

a determination unit determining whether or not both the tilt state stored in the storage unit and the tilt state of the mobile terminal read by the reading unit indicate the same tilt state; and a processing unit performing processing based on the predetermined information read by the reading unit when the determination unit determines that the tilt state of the reading surface and the tilt state of the mobile terminal indicate the same tilt state.

A third exemplary embodiment relates to an information code reading system comprising a mobile terminal provided with a screen and a reader which acquires predetermined information by optically reading an information code displayed on the screen of the mobile terminal, characterized in that the mobile terminal comprises a terminal-side detecting unit detecting a terminal-side detecting unit detecting a tilt state of the mobile terminal relative to a horizontal plane;

a generation unit generating the information code, the tilt state of the mobile terminal, detected by the terminal-side detecting unit, and the predetermined information being recorded in the information code; and a display unit displaying the information code generated by the generation unit, and the reader comprises:

an imaging unit provided with a reading surface and configured to image the information code held over the reading surface, a reading unit reading both the tilt state of the mobile terminal and the predetermined information from the information code imaged by the imaging unit;

an estimation unit estimating the tilt state of the mobile terminal based on distortion of the information code imaged by the imaging unit;

a determination unit determining whether or not the tilt state of the mobile terminal estimated by the estimation unit and the tilt state of the mobile terminal read by the reading unit indicate the same tilt state when the reading unit reads the information code; and a processing unit performing processing which uses the predetermined information read by the reading unit when the determination unit determines that the tilt state of the mobile terminal estimated by the estimating unit and the tile state of the mobile terminal read by the reading unit indicate the same tilt state.

In addition, the systems according to the foregoing first to third exemplary embodiments can also be realized as methods providing equivalent functions to those of the systems.

Advantageous Effects

According to the first exemplary embodiment described above, in the mobile terminal, at least one of a state of the mobile terminal and a state around the mobile terminal is detected as the terminal environment state by the terminal-side detecting unit, and the information code is generated by the generation unit such that the detected terminal environment state and the predetermined information are recorded therein, and the information code thus generated is displayed on the display unit. In the reader, one of the state of the reading surface and the state around the reading surface, which is a state corresponding to the terminal environment state, is detected as a reading surface environment state by the reader-side detecting unit. When the determination unit determines that the reading surface environment state detected by the reader-side detecting unit in reading of the information code by the reading unit and the terminal environment state read by the reading unit indicate the same environment state, the processing unit performs processing based on the predetermined information that has been read by the reading unit.

Accordingly, the information code displayed on the display unit changes depending on the terminal environment state detected by the terminal-side detecting unit. For example, when the terminal environment state is a tilt state of the mobile terminal, a state of light or sound around the mobile terminal, or the like, the information code generated changes with a change in the tilt state of the mobile terminal, the state of light or sound around the mobile terminal, or the like, and thus the information code displayed on the display unit also changes accordingly. In addition, since the display unit of the mobile terminal is brought closer to and faces the reading surface of the reader at the timing when the information code is read by the reading unit, the terminal environment state detected by the terminal-side detecting unit and the reading surface environment state detected by the reader-side detecting unit become the same environment state. As a result, the reading surface environment state detected by the reader-side detecting unit and the terminal environment state read by the reading unit indicate the same environment state. For example, when the terminal environment state is a tilt state of the mobile terminal, a state of light or sound around the mobile terminal, or the like, the reading surface environment state becomes a tilt state of the reading surface, the state of light or sound around the reading surface, or the like, which is a state of the reading surface corresponding to the terminal environment state. Since the display unit of the mobile terminal and the reading surface of the reader are close to and face each other, the reading surface environment state and the terminal environment state indicate the same environment state. On the other hand, when an illegally duplicated information code is held over the reading surface, since the information code does not change with a change in the terminal environment state, the reading surface environment state detected by the reader-side detecting unit and the terminal environment state read by the reading unit are not likely to indicate the same environment state. Accordingly, when the information code is illegally duplicated, the processing unit is not likely to perform processing based on the predetermined information. Therefore, by using the terminal environment state recorded in the information code, it is possible to prevent unauthorized use of a duplicated information code without requiring communication with an external device such as a server.

According to an example, the predetermined information recorded in the information code is the authentication information, and, when the determination unit determines that the reading surface environment state and the terminal environment state indicate the same environment state, and the information associated with the authentication information read by the reading unit is stored in the storage unit, the processing unit performs authentication processing using the authentication information. Therefore, if the information code, in which the authentication information is recorded, is illegally duplicated, it is difficult for the processing unit to perform authentication using the authentication information. Accordingly, authentication for illegal purposes can be prevented.

According to another example, when the tilt state of the mobile terminal relative to the horizontal plane is detected by the terminal-side detecting unit as a terminal environment state, and the tilt state of the reading surface relative to the horizontal plane is detected by the reader-side detecting unit as a reading surface environment state. When the determination unit determines that the tilt state of the reading surface detected by the reader-side detecting unit in reading of the information code by the reading unit and the tilt state of the mobile terminal read by the reading unit indicate the same tilt state, the processing unit performs processing based on the predetermined information that has been read by the reading unit.

Since the display unit of the mobile terminal is brought closer to and faces the reading surface of the reader at the timing when the information code is read by the reading unit, the tilt state of the reading surface and the tilt state of the mobile terminal are likely to become the same tilt state. On the other hand, when an illegally duplicated information code is held over the reading surface, since the information code does not change with a change in the tilt state of the mobile terminal, the tilt state of the reading surface detected by the reader-side detecting unit and the tilt state of the mobile terminal read by the reading unit are not likely to indicate the same tilt state. In particular, since the tilt state is used for comparison, the detection can be easily performed compared with a case where other environment state such as light or sound is used. In addition, the tilt state of the reading surface and the tilt state of the mobile terminal are likely to become the same tilt state at the timing when the information code is read. Accordingly, the determination accuracy is improved, and unauthorized use of a duplicated information code can be reliably prevented.

According to still another example, as the tilt state of the mobile terminal detected by the terminal-side detecting unit changes stepwise, an information code is generated by the generation unit. Then, when the determination unit determines that the tilt state of the reading surface detected by the reader-side detecting unit in reading of the information code by the reading unit and the tilt state of the mobile terminal read by the reading unit indicate the same tilt state, and thereafter the determination unit determines that the tilt state of the reading surface detected by the reader-side detecting unit in reading of another information code and the tilt state of the mobile terminal read by the reading unit indicate the same tilt state, the processing unit performs processing based on the predetermined information that has been read by the reading unit.

When an illegally duplicated information code is held over the reading surface, the information code does not change with a change in the tilt state of the mobile terminal. As a consequence, even if the tilt state of the reading surface detected by the reader-side detecting unit in reading of the illegally duplicated information code and the tilt state of the mobile terminal that is read by the reading unit unintentionally indicate the same tilt state, a different information code is thereafter prevented from being read by the reading unit. Even if the information code is read thereafter, the tilt state of the mobile terminal will not be recorded in the information code. Alternatively, even if the information corresponding to the tilt state of the mobile terminal is recorded in the information code, it will not be the same tilt state as the tilt state of the reading surface detected by the reader-side detecting unit. Thus, unauthorized use of the duplicated information code can be more reliably prevented.

According to still another example, a tilt state of the mobile terminal, and at least one of a state of the mobile terminal, which is different from the tilt state of the mobile terminal, and a state around the mobile terminal are detected by the terminal-side detecting unit as a terminal environment state. Further, one of a tilt state of the reading surface and a state of the reading surface, which is different from the tilt state of the reading surface, and a state around the reading surface, which is a state corresponding to the terminal environment state, are detected by the reader-side detecting unit as a reading surface environment state. When the determination unit determines that the reading surface environment state detected by the reader-side detecting unit in reading of the information code by the reading unit and the terminal environment state read by the reading unit indicate the same environment state, the processing unit performs processing based on the predetermined information that has been read by the reading unit.

Thus, two or more environment states including the tilt state are detected at each of the mobile terminal and the reading surface. Accordingly, when an illegally duplicated information code is held over the reading surface, the reading surface environment state detected by the reader-side detecting unit and the terminal environment state read by the reading unit are not likely to indicate the same environment state, compared with a case where one environment state is detected. Therefore, unauthorized use of the duplicated information code can be reliably prevented.

Further, according to the second exemplary embodiment described above, in the mobile terminal, a tilt state of the mobile terminal relative to the horizontal plane is detected by the terminal-side detecting unit, and the information code is generated by the generation unit such that the detected tilt state of the mobile terminal and the predetermined information are recorded therein, and the information code thus generated is displayed on the display unit. In the reader, the tilt state of the reading surface relative to the horizontal plane is detected and stored in the storage unit in advance. When the determination unit determines that the tilt state of the reading surface stored in the storage unit and the tilt state of the mobile terminal read by the reading unit indicate the same tilt state, the processing unit performs processing based on the predetermined information that has been read by the reading unit.

With this configuration as well, as in the example described above, it is possible to make it difficult for the tilt state of the reading surface stored in the storage unit and the tilt state of the mobile terminal read by the reading unit to indicate the same tilt state when an illegally duplicated information code is held over the reading surface. Therefore, since the processing unit is not likely to perform processing based on the predetermined information when the information code is illegally duplicated, unauthorized use of the duplicated information code can be prevented without requiring communication with an external device such as a server. In particular, in the reader, since the tilt state of the reading surface is detected and stored in the storage unit in advance, a sensor or the like for detecting the tilt state of the reading surface can be omitted to thereby simplify the reader and reduce the cost.

Further, according to the third exemplary embodiment described above, in the mobile terminal, a tilt state of the mobile terminal relative to the horizontal plane is detected by the terminal-side detecting unit, and the information code is generated by the generation unit such that the detected tilt state of the mobile terminal and the predetermined information are recorded therein, and the information code thus generated is displayed on the display unit. In the reader, the estimation unit estimates the tilt state of the mobile terminal on the basis of the distortion in the image of the information code acquired by the imaging unit. When the determination unit determines that the tilt state of the mobile terminal estimated by the estimation unit in reading of the information code by the reading unit and the tilt state of the mobile terminal read by the reading unit indicate the same tilt state, the processing unit performs processing based on the predetermined information that has been read by the reading unit.

With this configuration as well, as in the example described above, it is possible to make it difficult for the tilt state of the mobile terminal estimated by the estimation unit and the tilt state of the mobile terminal read by the reading unit to indicate the same tilt state when an illegally duplicated information code is held over the reading surface. Therefore, since the processing unit is not likely to perform processing based on the predetermined information when the information code is illegally duplicated, unauthorized use of the duplicated information code can be prevented without requiring communication with an external device such as a server. In particular, in the reader, since the tilt state of the mobile terminal is estimated on the basis of the distortion in the image of the information code acquired by the imaging unit, a sensor or the like for detecting the tilt state of the mobile terminal or the reading surface can be omitted to thereby simplify the reader and reduce the cost.

For example, as the tilt state of the mobile terminal detected by the terminal-side detecting unit changes stepwise, an information code is generated by the generation unit. Then, when the determination unit determines that the tilt state of the mobile terminal estimated by the estimation unit in reading of the information code by the reading unit and the tilt state of the mobile terminal read by the reading unit indicate the same tilt state, and thereafter the determination unit determines that the tilt state of the mobile terminal estimated by the estimation unit in reading of another information code and the tilt state of the mobile terminal read by the reading unit indicate the same tilt state, the processing unit performs processing based on the predetermined information that has been read by the reading unit.

With this configuration as well, as in the example described above, unauthorized use of the duplicated information code C can be more reliably prevented.

Further, according to still another example, a wall surrounding the reading surface is provided in the reader. Since the wall functions as a guide when the display unit of the mobile terminal is brought closer to and face the reading surface, the display unit is readily guided to a position immediately above the reading surface, which is suitable for reading. Accordingly, the positional relationship between the display unit and the reading surface can be readily limited to the position suitable for reading.

DETAILED DESCRIPTION OF THE PREFERRED EMBODIMENTS

First Embodiment

An information code reading system according to a first embodiment of the present invention will be described with reference to the drawings.

Figure 1:
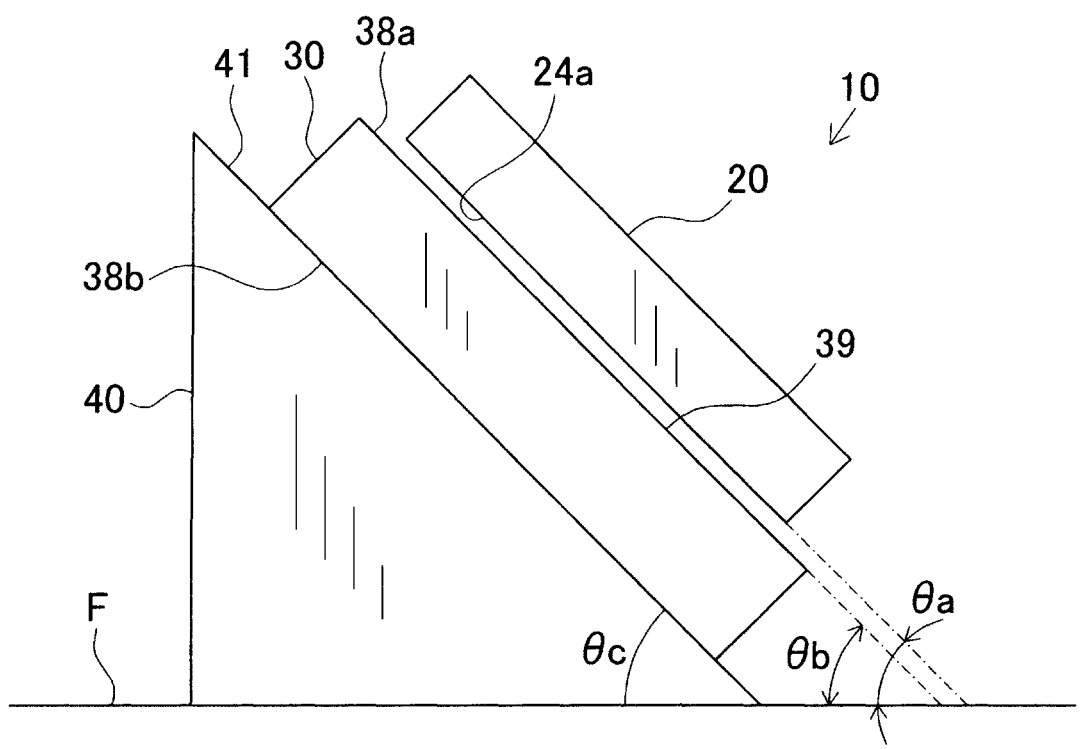
FIG. 1 is a view illustrating a schematic configuration of an information code reading system according to a first embodiment.

An information code reading system 10 shown in FIG. 1 is configured as a system having a reader 30 that optically reads an information code C displayed on a mobile terminal 20 to obtain predetermined information. According to the information code reading system 10 of the present embodiment, in order to prevent unauthorized use of the information code C such as duplicated information code C, the information code C is generated in the mobile terminal 20 such that a detected terminal environment state is recorded in addition to the predetermined information. That is, by virtue of a configuration in which the information code C displayed on the mobile terminal 20 changes with a change in the detected terminal environment state, unauthorized use of a duplicated information code, which does not change with a change in the terminal environment state, is prevented.

Figure 2:
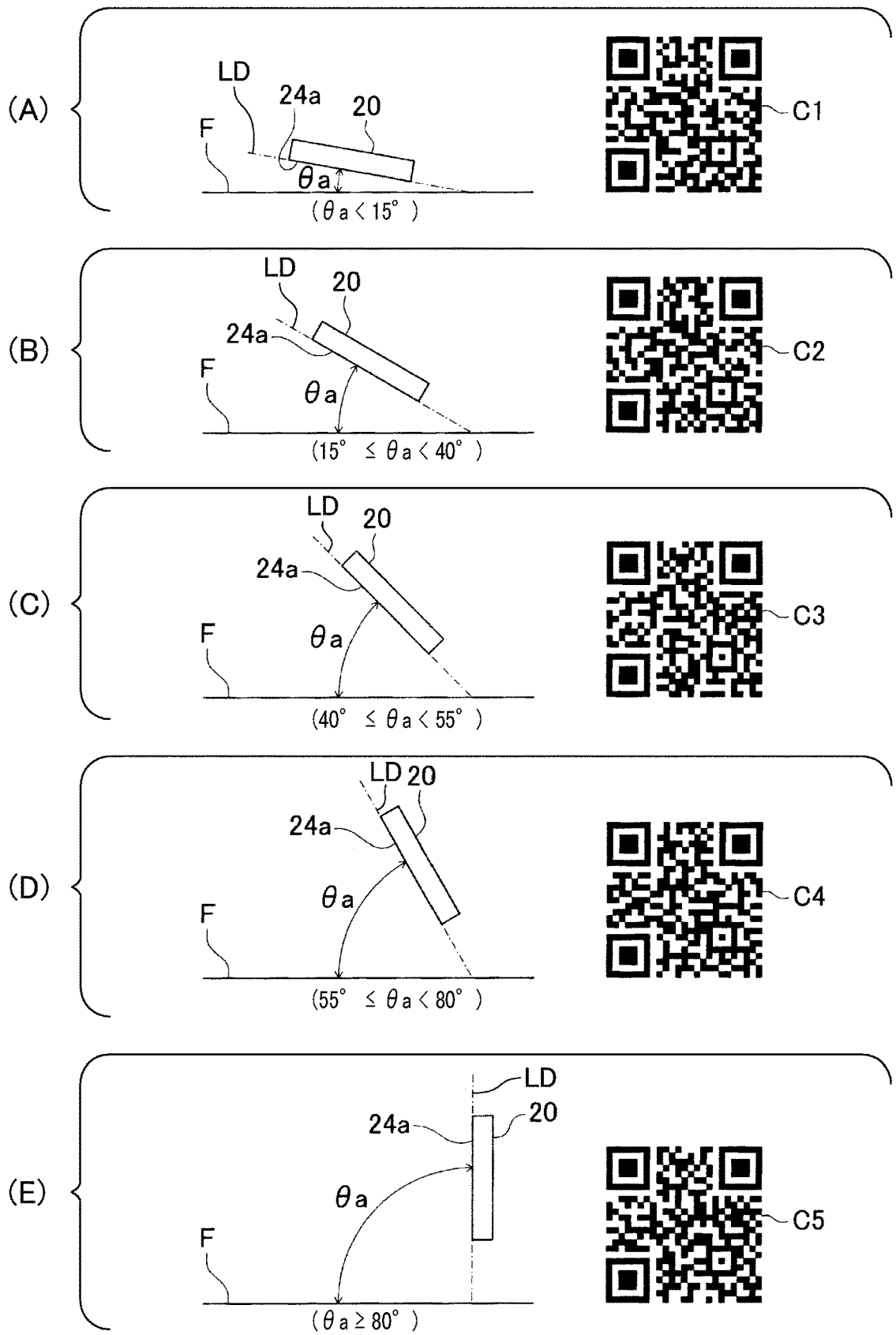
FIG. 2 is a view illustrating an information code generated so as to change depending on a terminal tilt state, in which a part (A) of FIG. 2 shows a first tilt state, a part (B) of FIG. 2 shows a second tilt state, a part (C) of FIG. 2 shows a third tilt state, a part (D) of FIG. 2 shows a fourth tilt state, and a part (E) of FIG. 2 shows a fifth tilt state.

In the present embodiment, a tilt state of the mobile terminal 20 relative to a horizontal plane F (hereinafter, also referred to as a terminal tilt state) is adopted as the above terminal environment state. Specifically, as illustrated in FIG. 2, the terminal tilt state is, for example, a state specified from an angular range that includes a tilt angle (hereinafter, also referred to as a screen tilt angle ∠a) of a longitudinal axial direction LD of a display screen 24*a* that displays the information code C relative to the horizontal plane F. In detection, the terminal tilt state is divided into 5 stages from a first tilt state to a fifth tilt state.

Accordingly, as shown in a part (A) of FIG. 2, when the screen tilt angle ∠a relative to the horizontal plane F is less than 15é, the terminal tilt state is detected as a first tilt state, whereby an information code C1 is generated such that the information indicating the first tilt state and the above predetermined information are recorded therein. Further, as shown in a part (B) of FIG. 2, when the screen tilt angle ∠a relative to the horizontal plane F is in the range of 15é or more and less than 40é, the terminal tilt state is detected as a second tilt state, whereby an information code C2 is generated such that the information indicating the second tilt state and the above predetermined information are recorded therein. Further, as shown in a part (C) of FIG. 2, when the screen tilt angle ∠a relative to the horizontal plane F is in the range of 40é or more and less than 55é, the terminal tilt state is detected as a third tilt state, whereby an information code C3 is generated such that the information indicating the third tilt state and the above predetermined information are recorded therein. Further, as shown in a part (D) of FIG. 2, when the screen tilt angle ∠a relative to the horizontal plane F is in the range of 55é or more and less than 80é, the terminal tilt state is detected as a fourth tilt state, whereby an information code C4 is generated such that the information indicating the fourth tilt state and the above predetermined information are recorded therein. Further, as shown in FIG. a part (E) of FIG. 2, when the screen tilt angle ∠a relative to the horizontal plane F is 80é or more, the terminal tilt state is detected as a fifth tilt state, whereby an information code C5 is generated such that the information indicating the fifth tilt state and the above predetermined information are recorded therein. In addition, in order to make it difficult for a third party to know that the shape of the information code C in the image displayed on the display screen 24a changes with a change in the terminal tilt state of the mobile terminal 20, the information code C can be set so as not to be displayed when the screen tilt angle ∠a is equal to or smaller than a predetermined threshold, which is set to be less than 0é, or the screen tilt angle ∠a is equal to or larger than a predetermined threshold, which is set to be more than 90é. Furthermore, the screen tilt angle ∠a may be set at any angle to set a desired number of tilt stages, for example, 5 or more stages, for the terminal tilt state.

In the present embodiment, the information indicative of each of the first to fifth tilt states is set as the numerical value indicative of the angular range that includes the screen tilt angle ∠a relative to the horizontal plane F. For example, when the reader 30 reads the information indicative of the first tilt state from the information code C1, the reader 30 recognizes an angular range that includes the tilt angle of the display screen 24a, that is, an angular range that includes the tilt angle of the mobile terminal 20 displaying the information code C1, as the screen tilt angle ∠a<15é.

Figure 3:
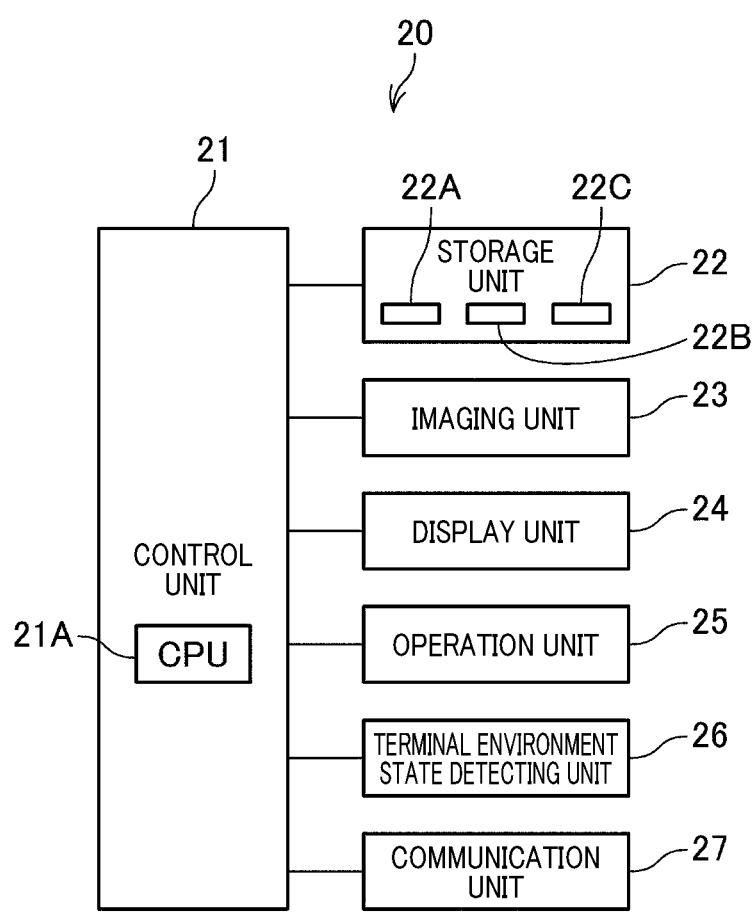
FIG. 3 is a block diagram schematically illustrating an electric configuration of a mobile terminal of FIG. 1.

The mobile terminal 20 that generates and displays the information code C depending on and reflecting the terminal tilt state (screen tilt angle ∠a) is configured by installation of a predetermined application program (hereinafter, also referred to as a code display application) into a mobile information terminal such as a smartphone owned by the user. As shown in FIG. 3, the mobile terminal 20 mainly includes a control unit 21 composed of arithmetic elements including a CPU 21A, and a storage unit 22 composed of an ROM 22A, an RAM 22B, a nonvolatile memory 22C, and the like. These elements 21 and 22 constitute a main part of an arithmetic unit. In this example, the ROM 22A functions as a non-transitory computer readable storage medium in which a desired computer program including a program for a code display procedure according to the present example is pre-stored. The mobile terminal 20 further includes an imaging unit 23 configured as a camera having a light receiving sensor (e.g., C-MOS area sensor, CCD area sensor, and the like), a display unit 24 having a display screen 24a that displays the information code C, an operation unit 25 composed of various operation keys, a touch panel, or the like (not shown), a terminal environment state detecting unit 26, a communication unit 27 configured as a communication interface for communicating with an external device, and the like.

In the present embodiment, the terminal environment state detecting unit 26 is configured as a tilt sensor based on a triaxial acceleration sensor or the like for detecting a screen tilt angle ∠a, which is a tilt angle of the longitudinal axial direction of the display screen 24a relative to the horizontal plane F. The terminal environment state detecting unit 26 outputs a tilt signal according to the detected screen tilt angle ∠a to the control unit 21, and the control unit 21 detects the terminal tilt state on the basis of the screen tilt angle ∠a according to the tilt signal. The control unit 21 and the terminal environment state detecting unit 26 can correspond to an example of a 'terminal-side detecting unit.

In the mobile terminal 20 configured as described above, the code display procedure is performed by the control unit 21 activating the code display application. Accordingly, the terminal tilt state is detected as any one of the first tilt state to the fifth tilt state depending on the detection result by the terminal environment state detecting unit 26, and then the information code C, in which the terminal tilt state and the predetermined information are recorded, is generated and displayed. The details of the code display procedure performed by the control unit 21 will be described later.

Figure 4:
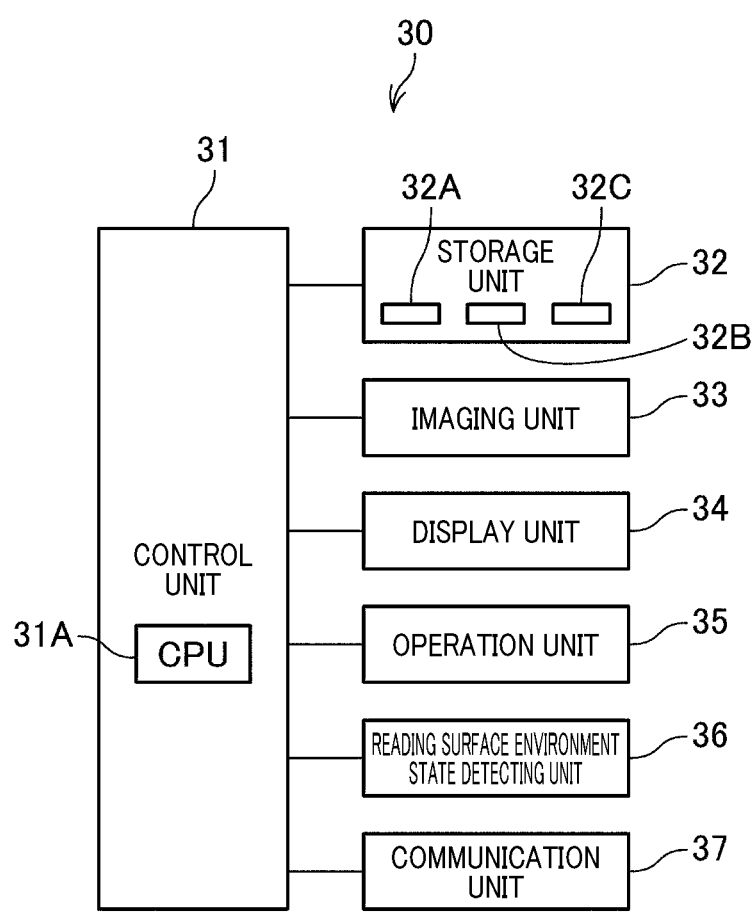
FIG. 4 is a block diagram schematically illustrating an electric configuration of a reader of FIG. 1.

As shown in FIG. 4, the reader 30 includes a control unit 31 composed of arithmetic elements including a CPU 31A, and a storage unit 32 composed of an ROM 32A, an RAM 32B, a nonvolatile memory 32C, and the like. In this example, the ROM 32A functions as a non-transitory computer readable storage medium in which a desired computer program including a program for a code reading procedure according to the present example is pre-stored. The reader 30 further includes an imaging unit 33 configured as a camera having a light receiving sensor (e.g., C-MOS area sensor, CCD area sensor, and the like), a display unit 34 composed of a liquid crystal display or the like, an operation unit 35 composed of various operation keys or the like (not shown), a reading surface environment state detecting unit 36, a communication unit 37 configured as a communication interface for communicating with an external device, and the like.

Figure 5:
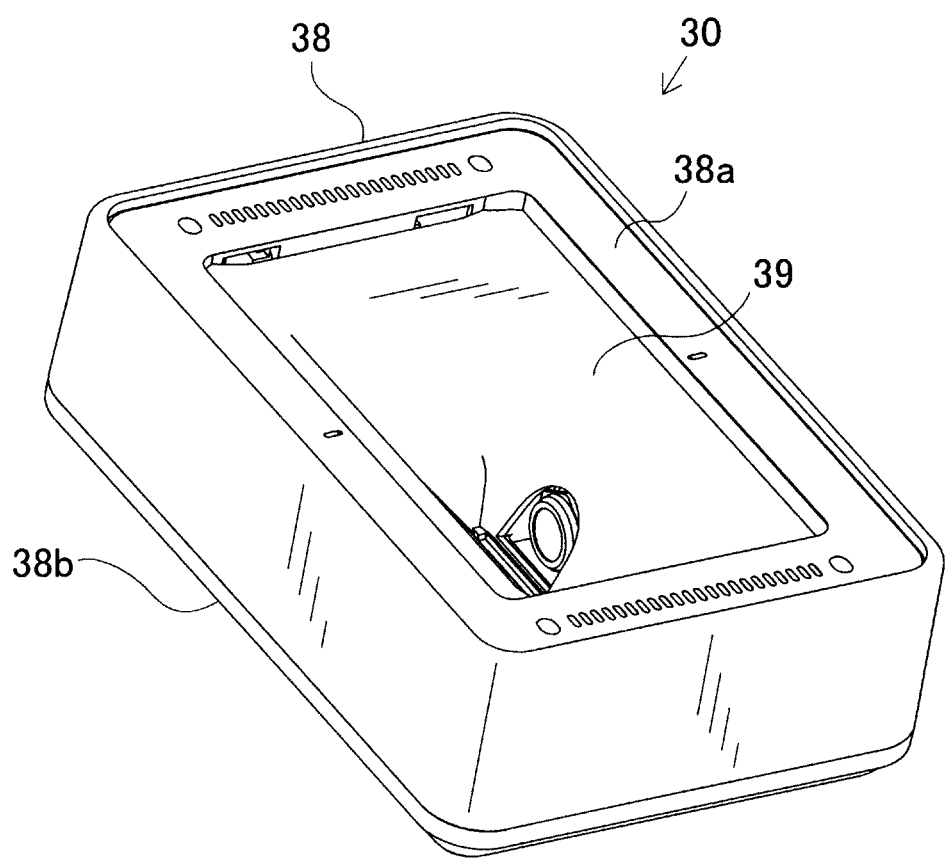
FIG. 5 is a perspective view of a reader of FIG. 1.

As shown in FIGS. 1 and 5, the reader 30 has an outer shell formed of a substantially box-shaped housing 38, which has an upper surface 38a and a lower surface 38b that are parallel to each other. A translucent reading surface 39 is provided as a reading port of a substantially rectangular shape at the center of the upper surface 38a. The imaging unit 33 and the like are accommodated in the housing 38 such that the information code C held over the reading surface 39 is read via the reading surface 39.

The control unit 31 is configured to acquire an image of the information code C by the imaging unit 33, and analyze the image data of the information code C stored in the storage unit 32 to decode the data recorded in the information code C by a known decoding method. Further, the control unit 31 that optically reads the information code C, together with the imaging unit 33, can correspond to an example of a 'reading unit.

The reading surface environment state detecting unit 36 is configured to detect a state corresponding to the terminal environment state detected by the terminal environment state detecting unit 26 as a reading surface environment state. Specifically, in the present embodiment, the reading surface environment state detecting unit 36 is configured as a tilt sensor based on a triaxial acceleration sensor or the like for detecting a reading surface tilt angle ∠b (see FIG. 1), which is a tilt angle of the longitudinal axial direction of the reading surface 39 relative to the horizontal plane F. The reading surface environment state detecting unit 36 outputs a tilt signal according to the detected reading surface tilt angle ∠b to the control unit 31, and the control unit 31 detects the reading surface tilt state on the basis of the reading surface tilt angle ∠b recognized from the tilt signal. In the present embodiment, as with the terminal tilt state, the reading surface tilt state is detected and divided into 5 stages from a first tilt state to a fifth tilt state. The control unit 31 and the reading surface environment state detecting unit 36 can correspond to an example of an 'apparatus-side detecting unit.

Referring to FIG. 1, the reader 30 configured as described above is mounted on a tilt surface 41 of a pedestal 40. The tilt surface 41 is formed as a planar shape and is set to have a tilt angle ∠c of, for example, 45° relative to the horizontal plane F. Accordingly, the reading surface environment state detecting unit 36 of the reader 30 mounted on the tilt surface 41 detects the reading surface tilt angle ∠b as substantially the same numerical value as the tilt angle ∠c.

Next, with reference to the drawings, details of the code display procedure performed by the mobile terminal 20 and the reading procedure performed by the reader 30 when the reader 30 that reads the information code C displayed on the mobile terminal 20 performs processing using or based on the above predetermined information will be described below.

The following description will be given of the case where the reader 30 is mounted on the tilt surface 41 of the pedestal 40 at an entrance gate of a live venue, and the information code C displayed on the mobile terminal 20 is used as an admission ticket. In this case, the above predetermined information stored in the storage unit 22 of the mobile terminal 20 is an individual ID, which has been obtained from a ticket management server or the like as the authentication information at the time of issue of the admission ticket, while the individual ID is stored in the storage unit 32 of the reader 30 as the information associated with the authentication information. The authentication information may also include, in addition to the individual ID, serial information capable of identifying the mobile terminal 20, and, when the reader 30 used for reading is specified, device information capable of identifying the reader 30.

First, with reference to the flowchart shown in FIG. 6, the code display procedure performed by the mobile terminal 20 will be described in detail.

Figure 6:
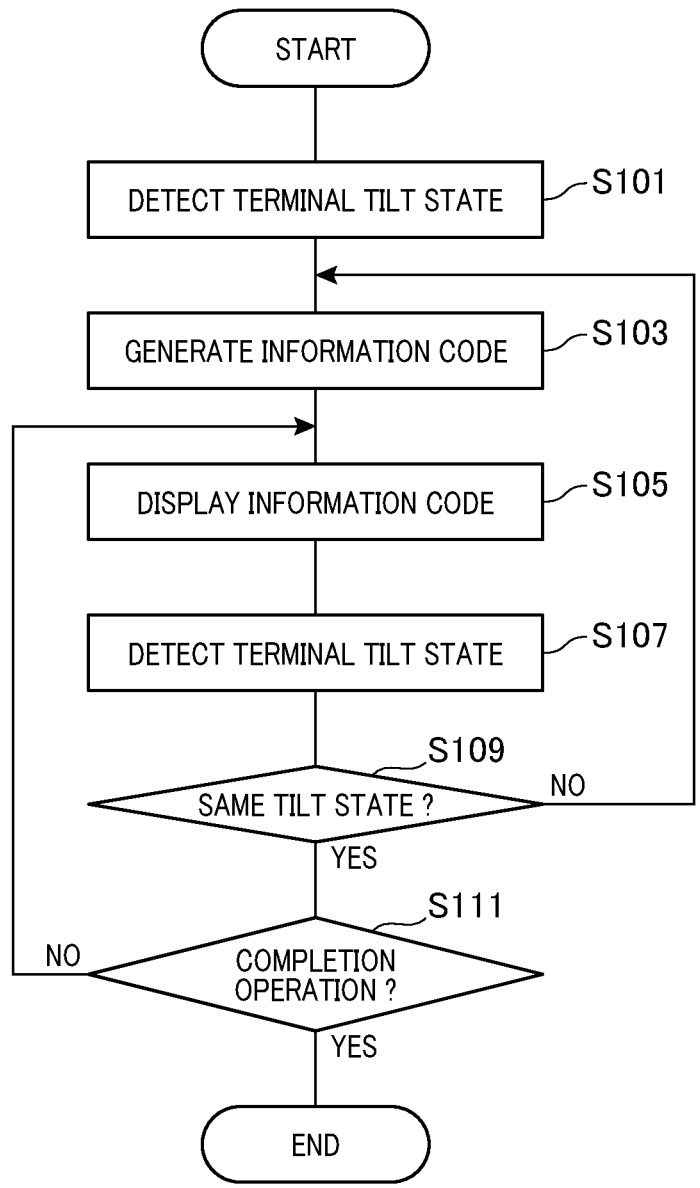
FIG. 6 is a flowchart showing a flow of a code display procedure performed by a mobile terminal in the first embodiment.

When the code display procedure is started by the control unit 21 of the mobile terminal 20 activating the code display application in response to a predetermined operation performed by the user passing through the entrance gate, terminal tilt state detection is performed at step S101 in FIG. 6. In this step, a terminal tilt state is detected on the basis of the screen tilt angle ∠a obtained from the detection result by the terminal environment state detecting unit 26.

When the terminal tilt state is detected as described above, an information code C is generated such that the detected terminal tilt state and the individual ID are recorded therein (S103), and the generated information code C is displayed on the display screen 24a of the display unit 24 (S105). The control unit 21 that generates the information code C can correspond to an example of a 'generation unit.

Subsequently, at step S107, detection is again performed to detect a terminal tilt state. Then, at step S109, determination is performed whether or not the terminal tilt state currently detected is the same as the terminal tilt state previously detected. Here, since the mobile terminal 20 is being held over the reading surface 39 of the reader 30, it is determined as 'No in step S109 if the terminal tilt state currently detected differs from the terminal tilt state previously detected. The information code C is generated such that the terminal tilt state currently detected and the individual ID are recorded therein (S103), and the information code C thus generated is displayed on the display screen 24a of the display unit 24 (S105). That is, information code C displayed on the display screen 24a of the display unit 24 is changed.

On the other hand, since the mobile terminal 20 is stationary while being held over the reading surface 39 of the reader 30, it is determined as 'Yes in step S109 if the terminal tilt state currently detected is the same as the terminal tilt state previously detected. The display state of the information code C remains the same (S105) unless a predetermined completion operation is performed (No at S111).

For example, as illustrated in FIG. 1, when the reader 30 is mounted on the tilt surface 41 of the pedestal 40 whose tilt angle ∠c is 45°, and thus the reading surface tilt angle ∠b is approximately 45°, in the mobile terminal 20 which is stationary with the display screen 24a being brought closer to and facing the reading surface 39, the screen tilt angle ∠a is detected as approximately 45°. Accordingly, the terminal tilt state is detected as a third tilt state, and an information code C3 is generated such that the information indicating the third tilt state and the individual ID are recorded therein, and the information code C3 thus generated is displayed on the display screen 24a.

Figure 7:
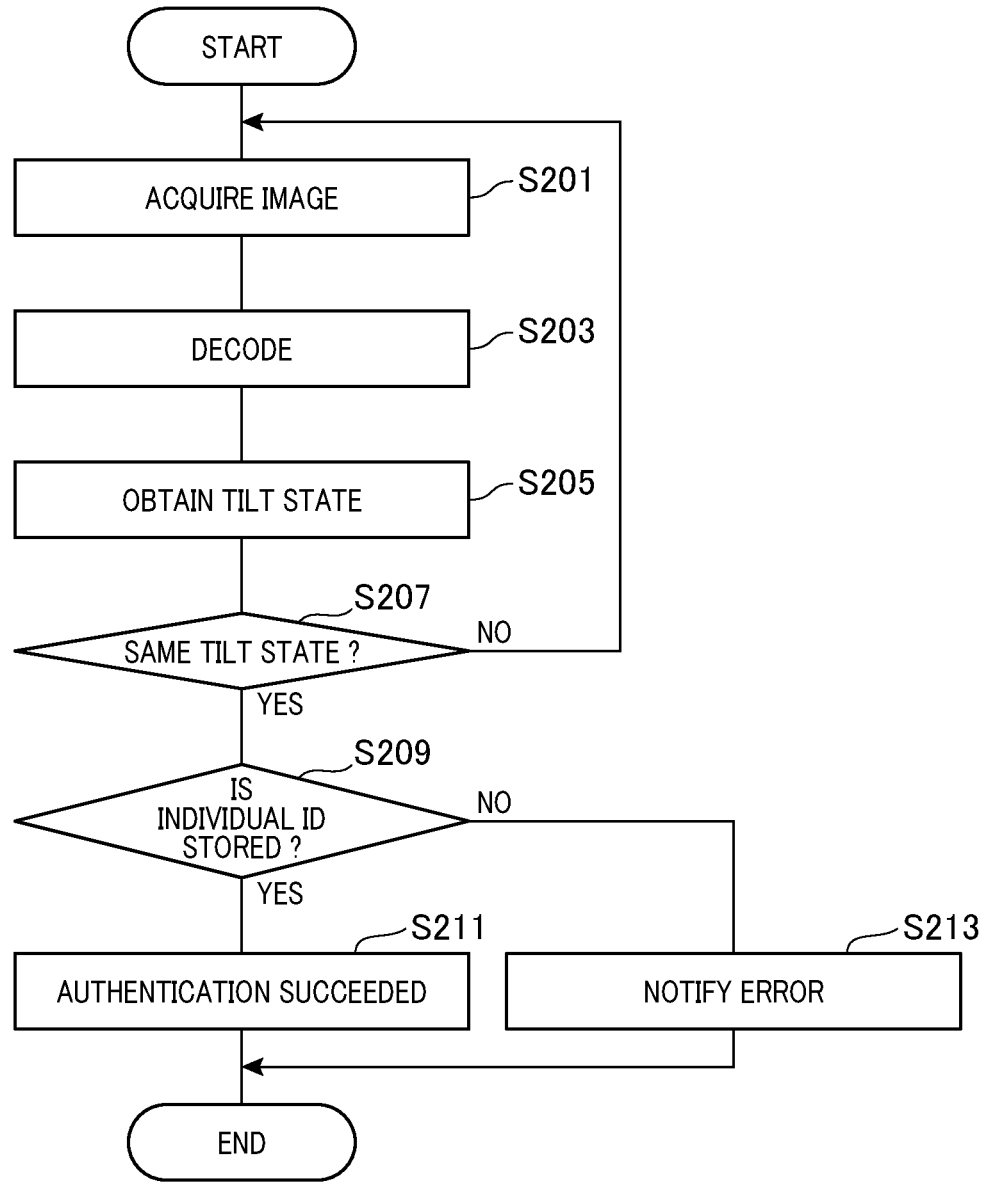
FIG. 7 is a flowchart showing a flow of a reading procedure performed by a reader in the first embodiment.

Next, with reference to the flowchart shown in FIG. 7, the reading procedure performed by the reader 30 will be described in detail. When the reading procedure is started by the control unit 31 of the reader 30 in response to a predetermined operation performed by an administrator or the like who manages the entrance gate, the information code C held over the reading surface 39 becomes ready to be imaged. As the information code C displayed on the display screen 24a of the display unit 24 by the user is held over the reading surface 39, the information code C is imaged by the imaging unit 33 (S201 in FIG. 7). Then, the information code C thus acquired is decoded to read the information indicating the terminal tilt state and the individual ID (S203).

Then, at step S205, tilt state obtaining is performed to obtain a reading surface tilt state on the basis of the reading surface tilt angle ∠b recognized from the detection result by the reading surface environment state detecting unit 36. For example, as illustrated in FIG. 1, when the reader 30 is mounted on the tilt surface 41 of the pedestal 40 whose tilt angle ∠c is 45°, and thus the reading surface tilt angle ∠b is approximately 45°, the reading surface tilt state is detected and obtained as a third tilt state (40°≤∠b<55°).

Subsequently, at step S207, determination is performed whether or not the reading surface tilt state obtained in the above tilt state obtaining and the terminal tilt state read in the above decoding indicate the same tilt state. The control unit 31 that performs determination in step S207 can correspond to an example of a `determination unit.

Here, for example as illustrated in FIG. 1, in which the display screen 24a of the mobile terminal 20 is stationary while being brought closer to and facing the reading surface 39 of the reader 30, the reading surface tilt state is the third tilt state, and the terminal tilt state is the third tilt state since the information code C3 has been read. Accordingly, it is determined that both indicate the same tilt state (Yes at S207). In this case, since the individual ID which is the same as the individual ID that has been read together with the information indicating the terminal tilt state is stored in the storage unit 32 (Yes in S209), the authentication is successful (S211). Accordingly, the entrance gate permits passage, and the history of passage is stored in the storage unit 32.

The control unit 31 that performs processing using the individual ID that has been read (predetermined information, authentication information) can correspond to an example of a 'processing unit.

Further, for example, when the reader 30 is mounted on the tilt surface 41 of the pedestal 40 whose tilt angle ∠c is 30°, and thus the reading surface tilt angle ∠b is approximately 30°, the reading surface tilt state detected as the second tilt state (15°≤b<40°). In the mobile terminal 20 which is stationary while being brought closer to and facing the reading surface 39 of the reader 30 of this tilt state, the terminal tilt state is detected as the second tilt state (15°≤a<40°), and the information code C2 is displayed on the display screen 24a. In this case as well, it is determined that both indicate the same tilt state (Yes at S207).

On the other hand, when an illegally duplicated information code C3 is held over the reading surface 39 of the reader 30 mounted on the tilt surface 41 of the pedestal 40 whose tilt angle ∠c is 30°, the reading surface tilt state is detected as the second tilt state (15°≤b<40°), while the information indicating the third tilt state is read from the information code C. Accordingly, since it is determined they are different tilt states (No at S207), the authentication fails, and passage through the entrance gate remains prohibited.

In addition, even if the reading surface tilt state that has been detected in the above tilt state obtaining and the terminal tilt state that has been read in the above decoding are the same tilt state, there may be a case where the individual ID that has been read together with the information indicating the terminal tilt state is not stored in the storage unit 32, or is determined as an invalid ID due to having been already read or the like. In such a case, since it is determined as 'No in step S209, the authentication fails, and error notification is performed by using display or the like by the display unit 34 (S213). Further, the error notification may also be performed when the determination of 'No is repeated a predetermined number of times or more in step S207.

As described above, according to the information code reading system 10 of the present embodiment, in the mobile terminal 20, the terminal tilt state is detected as the terminal environment state by the terminal environment state detecting unit 26, and the information code C is generated such that the detected terminal environment state and the predetermined information are recorded therein, and the information code C thus generated is displayed on the display screen 24a of the display unit 24. In the reader 30, the reading surface tilt state corresponding to the terminal environment state is detected as the reading surface environment state by the reading surface environment state detecting unit 36. When it is determined that the reading surface environment state detected by the reading surface environment state detecting unit 36 in reading of the information code C by the reader 30 and the terminal environment state that is read indicate the same environment state, the control unit 31 performs processing using the predetermined information that has been read.

Accordingly, the information code C displayed on the display screen 24a of the display unit 24 changes depending on the terminal environment state detected by the terminal environment state detecting unit 26. In addition, since the display screen 24a of the mobile terminal 20 is brought closer to and faces the reading surface 39 of the reader 30 at the timing when the information code C is read by the reader 30, the terminal environment state detected by the terminal environment state detecting unit 26 and the reading surface environment state detected by the reading surface environment state detecting unit 36 become the same environment state. As a result, the reading surface environment state detected by the reading surface environment state detecting unit 36 and the terminal environment state read by the reader 30 indicate the same environment state. On the other hand, when an illegally duplicated information code C is held over the reading surface 39, since the information code C does not change with a change in the terminal environment state, the reading surface environment state detected by the reading surface environment state detecting unit 36 and the terminal environment state read by the reader 30 are not likely to indicate the same environment state. Accordingly, when the information code C is illegally duplicated, the control unit 31 that functions as a processing unit is not likely to perform processing using the predetermined information. Therefore, by using the terminal environment state recorded in the information code C, it is possible to prevent unauthorized use of a duplicated information code C without requiring communication with an external device such as a server.

Further, the predetermined information recorded in the information code C is the authentication information for the individual ID or the like, and authentication using the authentication information is performed by the control unit 31 when it is determined that the reading surface environment state and the terminal environment state indicate the same environment state, and the information associated with the authentication information read by the reader 30 is stored in the storage unit 32. Therefore, if the information code C, in which the authentication information is recorded, is illegally duplicated, it is difficult for the control unit 31 to perform authentication using the authentication information. Accordingly, authentication for illegal purposes can be prevented.

In particular, the terminal tilt state of the display screen 24a of the mobile terminal 20 relative to the horizontal plane F is detected by the terminal environment state detecting unit 26 as a terminal environment state, and the reading surface tilt state of the reading surface 39 relative to the horizontal plane F is detected by the reading surface environment state detecting unit 36 as a reading surface environment state. When it is determined that the reading surface tilt state detected by the reading surface environment state detecting unit 36 in reading of the information code C by the reader 30 and the terminal tilt state read by the reader 30 indicate the same environment state, the control unit 31 performs processing using the predetermined information (authentication information) that has been read by the reader 30.

Since the display screen 24a of the mobile terminal 20 is brought closer to and faces the reading surface 39 of the reader 30 at the timing when the information code C is read by the reader 30, the reading surface tilt state and the terminal tilt state are likely to become the same tilt state. On the other hand, when an illegally duplicated information code C is held over the reading surface 39, since the information code C does not change with a change in the tilt state, the reading surface tilt state detected by the reading surface environment state detecting unit 36 and the terminal tilt state read by the reader 30 are not likely to indicate the same tilt state. In particular, since the tilt state is used for comparison, the detection can be easily performed compared with a case where other environment state such as light or sound is used. In addition, the reading surface tilt state and the terminal tilt state are likely to become the same tilt state at the timing when the information code C is read. Accordingly, the determination accuracy is improved, and unauthorized use of a duplicated information code C can be reliably prevented.

Furthermore, the terminal tilt state is not limited to being divided into 5 stages from a first tilt state to a fifth tilt state as a state specified from an angular range that includes the screen tilt angle θa, and may be divided, for example, into 2 to 4 stages, or may be divided into 6 or more stages to further improve security.

Second Embodiment

Next, an information code reading system according to a second embodiment will be described with reference to the drawings.

The second embodiment mainly differs from the first embodiment in that, after the reading surface tilt state and the terminal tilt state indicate the same tilt state in reading the information code, processing using the predetermined information that is read is performed when the reading surface tilt state and the terminal tilt state indicate the same tilt state in reading another information code. Accordingly, components which are the same or similar to those described in the first embodiment are denoted by the same reference signs, and the description thereof is simplified. This also applies to the description for various embodiments subsequent to the third embodiment described below.

In the present embodiment, the pedestal 40 is configured to be controlled by the reader 30 and the tilt angle θc of the tilt surface 41 is variable. That is, the reader 30 is configured to vary its reading surface tilt angle θb. In the reading procedure of the present embodiment, in order to reliably prevent unauthorized use of the duplicated information code C, the reading surface tilt state is changed after it is determined that the reading surface tilt state and the terminal tilt state indicate the same tilt state. When it is determined that the reading surface tilt state thus changed and the terminal tilt state newly read indicate the same tilt state, processing using the authentication information (predetermined information) that is read is performed.

Figure 8:
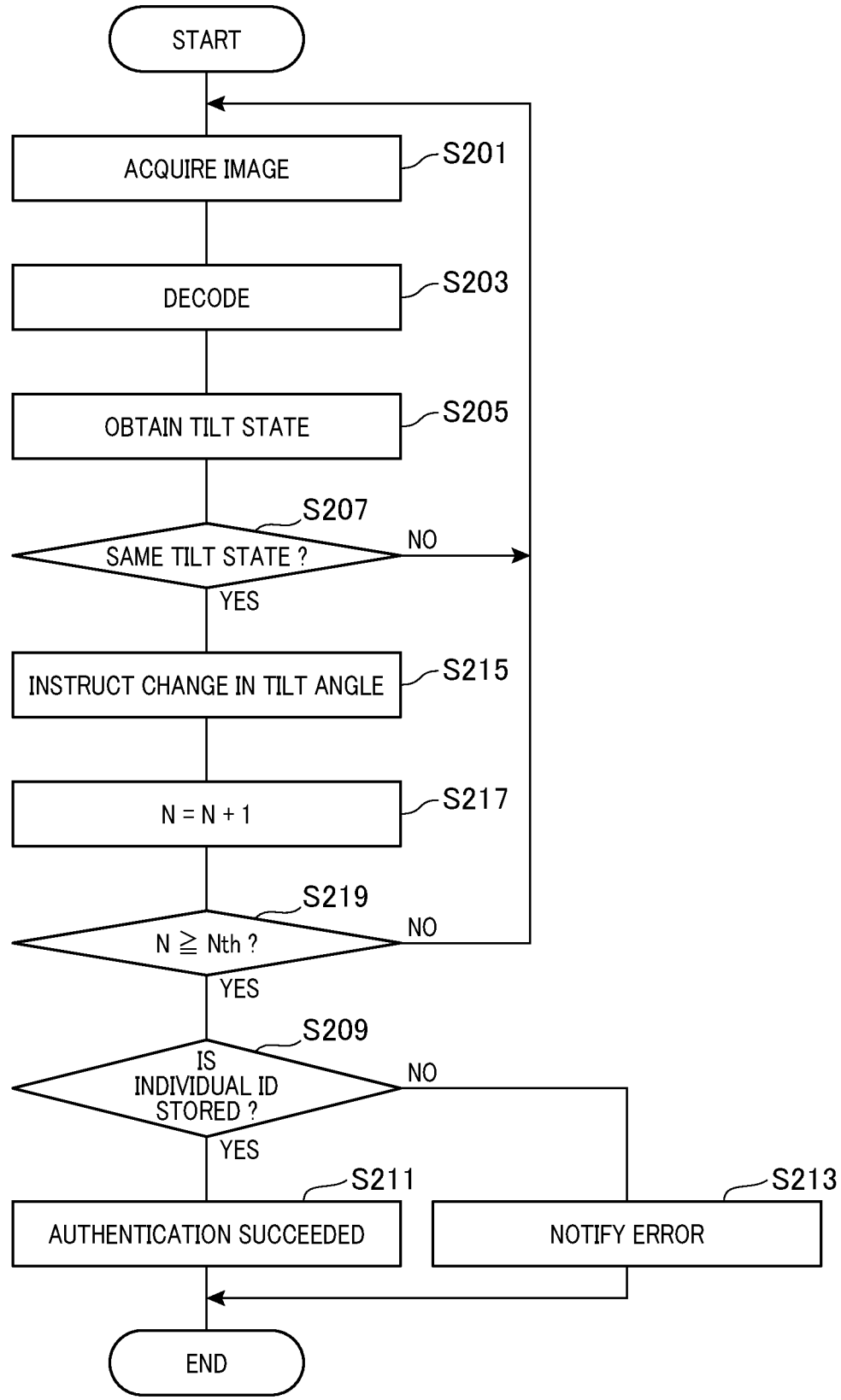
FIG. 8 is a flowchart showing a flow of a reading procedure performed by a reader in a second embodiment.

Next, with reference to the flowchart shown in FIG. 8, the reading procedure performed by the reader 30 in the second embodiment will be described in detail.

As in the first embodiment, when it is determined that the reading surface tilt state obtained in the above tilt state obtaining (S205 in FIG. 8) and the terminal tilt state read in the above decoding (S203) indicate the same tilt state (Yes at S207), tilt angle change instruction is performed at step S215. In this step, the tilt angle θc of the tilt surface 41 is changed to a preset value according to the instruction from the reader 30.

Subsequently, the number of determination N indicating the number of times that the reading surface tilt state and the terminal tilt state are determined as indicating the same tilt state is incremented (N=N+1) (S217). Then, at step S219, determination is performed whether or not the number of determination N is equal to or greater than a predetermined threshold Nth. In the present embodiment, for example, the initial tilt angle θc of the tilt surface 41 is set to 45°, the tilt angle θc of the tilt surface 41 subsequently changed is set to 30°, and a predetermined threshold Nth is set to 2. Therefore, when it is determined that the reading surface tilt state and the terminal tilt state indicate the same tilt state at the initial tilt angle θc (45°) of the tilt surface 41, an instruction is issued to the pedestal 40 to set the tilt angle θc of the tilt surface 41 at 30° (S215), whereby the number of determination N is incremented from 0 to 1 (S217). Since the number of determination N is less than the predetermined threshold Nth (No at S219), the steps from step S201 onward are repeated.

Then, as the tilt angle θc of the tilt surface 41 changes from 45° to 30°, the reading surface tilt angle θb chances from approximately 45° to approximately 30°. Accordingly, the reading surface tilt state detected at step S205 changes from the third tilt state to the second tilt state. When the display screen 24a of the mobile terminal 20 is brought closer to and faces the reading surface 39 whose tilt state has been changed, the screen tilt angle θa also changes from approximately 45° to approximately 30°. Accordingly, the information code C displayed on the display screen 24a changes from the information code C3 to the information code C2. By imaging and reading the information code C2 that has been changed, the information indicating the second tilt state is read (S203). In this case, it is determined that the reading surface tilt state that has been changed and the terminal tilt state newly read indicate the same second tilt state (Yes at S207), and the incremented number of determination N becomes equal to or greater than the predetermined threshold Nth (Yes at S219). Accordingly, the steps from step S209 onward are repeated.

As described above, in the information code reading system 10 of the present embodiment, the information code C is generated each time the terminal tilt state detected by the terminal environment state detecting unit 26 changes. Then, when it is determined that the reading surface tilt state detected by the reading surface environment state detecting unit 36 in reading of the information code C (for example, information code C3) by the reader 30 and the terminal tilt state that is read indicate the same tilt state, and thereafter it is determined that the reading surface tilt state detected by the reading surface environment state detecting unit 36 in reading of another information code C (for example, information code C2) and the terminal tilt state that is read indicate the same tilt state, the control unit 31 performs processing using the determination information (predetermined information) that has been read by the reader 30.

When an illegally duplicated information code C is held over the reading surface 39, the information code C does not change with a change in the tilt state. As a consequence, even if the reading surface tilt state detected by the reading surface environment state detecting unit 36 in reading of the illegally duplicated information code C and the terminal tilt state that is read unintentionally indicate the same tilt state, a different information code C is thereafter prevented from being read. Even if the information code C is read thereafter, the terminal tilt state will not be recorded in the information code C. Alternatively, even if the information corresponding to the terminal tilt state is recorded in the information code C, it will not be the same tilt state as the reading surface tilt state detected by the reading surface environment state detecting unit 36. Thus, unauthorized use of the duplicated information code C can be more reliably prevented.

Third Embodiment

Next, an information code reading system according to a third embodiment will be described with reference to the drawings.

The third embodiment mainly differs from the first embodiment in that the reading surface tilt state is detected and stored in the storage unit in advance, and the reading surface tilt state is not detected each time.

In the present embodiment, the reader 30 does not include the reading surface environment state detecting unit 36, and the reading surface tilt state corresponding to the tilt angle ∠c of the tilt surface 41 of the pedestal 40 on which the reader 30 is mounted is pre-stored in the storage unit 32. Accordingly, in the reading procedure performed by the control unit 31 of the reader 30, the information code C held over the reading surface 39 is imaged (S201 in FIG. 7), decoding is performed (S203), and then, tilt state obtaining is performed at step S205 to read and obtain the reading surface tilt state pre-stored in the storage unit 32.

Then, at step S207, determination is performed whether or not the reading surface tilt state read in the above tilt state obtaining and the terminal tilt state read in the above decoding indicate the same tilt state.

Thus, according to the present embodiment, in the mobile terminal 20, the terminal tilt state of the mobile terminal 20 relative to the horizontal plane F is detected by the terminal environment state detecting unit 26, and the information code C is generated such that the detected terminal tilt state and the authentication information (predetermined information) are recorded therein, and the information code C thus generated is displayed on the display screen 24a of the display unit 24. In the reader 30, the reading surface tilt state of the reading surface 39 relative to the horizontal plane F is detected and stored in the storage unit 32 in advance. Then, when it is determined that the reading surface tilt state stored in the storage unit 32 and the terminal tilt state that is read indicate the same tilt state, the control unit 31 that functions as the processing unit performs processing using the authentication information (predetermined information) that has been read by the reader 30.

With this configuration as well, as in the first embodiment, it is possible to make it difficult for the reading surface tilt state stored in the storage unit 32 and the terminal tilt state read by the reader 30 to indicate the same tilt state when an illegally duplicated information code C is held over the reading surface 39. Therefore, since the control unit 31 is not likely to perform processing using the authentication information (predetermined information) when the information code C is illegally duplicated, unauthorized use of the duplicated information code C can be prevented without requiring communication with an external device such as a server. In particular, in the reader 30, since the reading surface tilt state of the reading surface 39 is detected and stored in the storage unit 32 in advance, a sensor or the like for detecting the reading surface tilt state can be omitted to thereby simplify the reader 30 and reduce the cost.

In addition, a plurality of types of pedestals 40 having different tilt angles ∠c may be prepared, and the reading surface tilt state stored in the storage unit 32 can be changed depending on the tilt angle ∠c of the pedestal 40 on which the reader 30 is mounted. With this configuration, since a plurality of selectable reading surface tilt states can be prepared, the terminal tilt state read from the illegally duplicated information code C is more likely to be determined as a tilt state different from the reading surface tilt state. Accordingly, unauthorized use of the duplicated information code C can be reliably prevented.

Fourth Embodiment

Next, an information code reading system according to a fourth embodiment will be described with reference to the drawings.

The fourth embodiment mainly differs from the third embodiment in that a jig for a mobile terminal is used instead of the pedestal.

Figure 9:
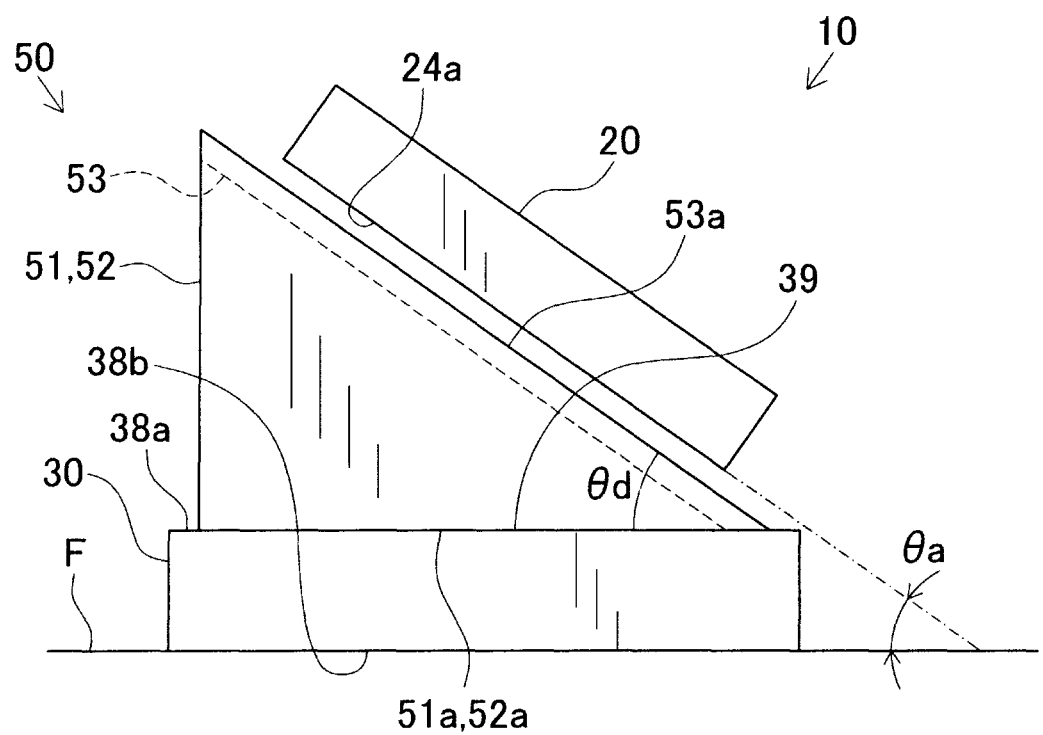
FIG. 9 is a view illustrating a schematic configuration of an information code reading system according to a fourth embodiment.

In the present embodiment, as shown in FIG. 9, the reader 30 is mounted on the horizontal plane F, and a jig for the mobile terminal (hereinafter, also referred to as a jig 50) that does not block the imaging field of the imaging unit 33 is mounted on the upper surface 38a of the housing 38. The jig 50, which includes a pair of triangular side plates 51 and 52, and a translucent inclined plate 53 supported by the side plates 51 and 52, functions as a guide for guiding the display screen 24a to a predetermined tilt state when the reader 30 reads the information code C.

The side plates 51 and 52 have flat bottoms 51a and 52a, respectively, and, when mounted on the upper surface 38a, face each other with the reading surface 39 therebetween. The tilt surface 53a of the inclined plate 53 is formed as a flat plate, forming a tilt angle ∠d relative to the bottoms 51a and 52a. The imaging unit 33 can image the information code C held over the tilt surface 53a via the reading surface 39 and the inclined plate 53. As shown in FIG. 9, in reading of the information code C, the tilt surface 53a functions as a reading surface for the display screen 24a which is brought closer to and faces the tilt surface 53a.

Further, in the present embodiment, the reading surface tilt state corresponding to the tilt angle ∠d of the tilt surface 53a of the jig 50 mounted on the upper surface 38a of the reader 30 is pre-stored in the storage unit 32.

Accordingly, in the reading procedure performed by the control unit 31 of the reader 30, the information code C held over the tilt surface 53a is imaged (S201 in FIG. 7), decoding is performed (S203), and then, tilt state obtaining is performed at step S205 to read and obtain the reading surface tilt state pre-stored in the storage unit 32. Then, at step S207, determination is performed whether or not the reading surface tilt state read in the above tilt state obtaining and the terminal tilt state read in the above decoding indicate the same tilt state.

With this configuration as well, as in the third embodiment, it is possible to make it difficult for the reading surface tilt state stored in the storage unit 32 and the terminal tilt state read by the reader 30 to indicate the same tilt state when an illegally duplicated information code C is held over the tilt surface 53a. Therefore, since the control unit 31 is not likely to perform processing using the authentication information (predetermined information) when the information code C is illegally duplicated, unauthorized use of the duplicated information code C can be prevented without requiring communication with an external device such as a server.

In addition, the jig 50 is not limited to being formed of the pair of side plates 51 and 52 and the inclined plate 53, and may also be formed using a translucent triangular prism or the like, as long as it has a translucent tilt surface which functions as a reading surface, and is provided on the upper surface 38a of the housing 38 so as not to block the imaging field of the imaging unit 33. Further, the jig 50 may also be formed to have an opening or the like in the reading surface 39 so that the display screen 24a is exposed therethrough to the tilt surface which functions as a reading surface.

Fifth Embodiment

Next, an information code reading system according to a fifth embodiment will be described with reference to the drawings.

The fifth embodiment mainly differs from the first embodiment in that the terminal tilt state is estimated on the basis of the distortion of the information code imaged.

In the present embodiment, the reader 30 does not include the reading surface environment state detecting unit 36, and the screen tilt angle ∠a is estimated on the basis of the distortion of the information code C imaged by the imaging unit 33, and the terminal tilt state is estimated from the screen tilt angle ∠a.

Figure 10:
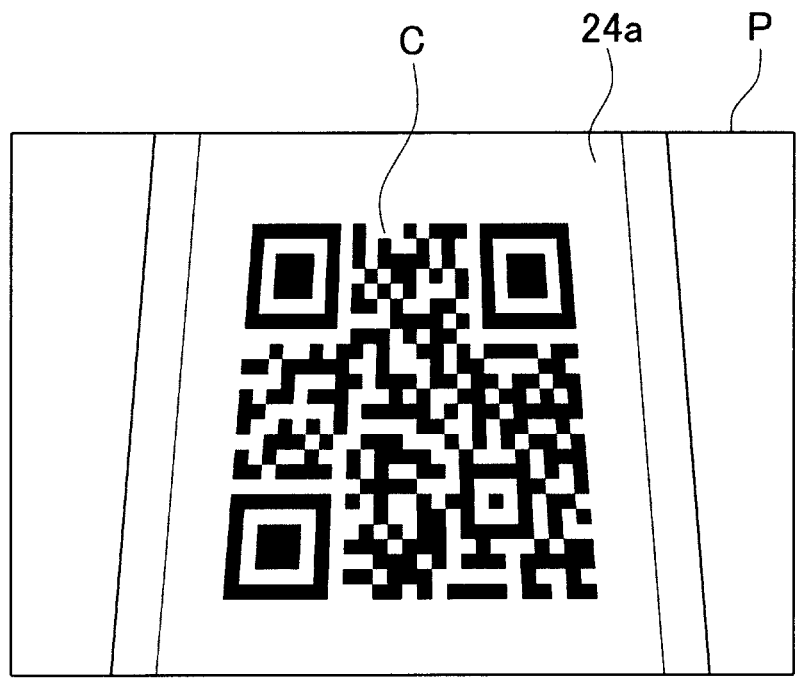
FIG. 10 is a view of a captured image of a mobile terminal that is tilt relative to a reading surface in a fifth embodiment.

In the image of the information code C acquired when the screen tilt angle ∠a and the reading surface tilt angle ∠b match, the information code C does not have distortion. On the other hand, in the image of the information code C acquired when the screen tilt angle ∠a and the reading surface tilt angle ∠b do not match, a difference between the screen tilt angle ∠a and the reading surface tilt angle ∠b causes distortion in the information code C. For example, when the display screen 24a largely tilts relative to the horizontal plane F to increase a difference between the screen tilt angle ∠a and the reading surface tilt angle ∠b relative to the reader 30 mounted on the horizontal plane F, a distortion occurs in the information code C as shown in an acquired image P in FIG. 10. The larger the difference between the screen tilt angle ∠a and the reading surface tilt angle ∠b, the larger the distortion occurring in the information code C. That is, the screen tilt angle ∠a can be estimated on the basis of the distortion of the information code C without holding the mobile terminal 20 stationary while causing the display screen 24a that displays the information code C to be in contact with the reading surface 39 or causing the display screen 24a to face the reading surface 39 with a small gap therebetween.

Accordingly to the present embodiment, in the reading procedure performed by the control unit 31 of the reader 30, the information code C held over the reading surface 39 is imaged (S201 in FIG. 7), decoding is performed (S203), and then, tilt state obtaining is performed at step S205 to estimate and obtain the terminal tilt state according to the screen tilt angle ∠a, which is estimated on the basis of the distortion in the image of the information code C acquired by the imaging unit 33. The control unit 31 that estimates the terminal tilt state can correspond to an example of an "estimation unit.

Then, at step S207, determination is performed whether or not the terminal tilt state estimated in the above tilt state obtaining and the terminal tilt state read in the above decoding indicate the same tilt state.

Thus, according to the present embodiment, in the mobile terminal 20, the terminal tilt state of the mobile terminal 20 relative to the horizontal plane F is detected by the terminal environment state detecting unit 26, and the information code C is generated such that the detected terminal tilt state and the authentication information (predetermined information) are recorded therein, and the information code C thus generated is displayed on the display screen 24a of the display unit 24. In the reader 30, the terminal tilt state is estimated on the basis of the distortion in the image of the information code C acquired by the imaging unit 33. Then, when it is determined that the terminal tilt state estimated when the information code C is read by the reader 30 and the terminal tilt state that is read indicate the same tilt state, the control unit 31 that functions as the processing unit performs processing using the authentication information (predetermined information) that has been read by the reader 30.

With this configuration as well, as in the first embodiment, it is possible to make it difficult for the estimated terminal tilt state and the terminal tilt state read from the information code C to indicate the same tilt state when an illegally duplicated information code C is held over the reading surface 39. Therefore, since the control unit 31 is not likely to perform processing using the authentication information (predetermined information) when the information code C is illegally duplicated, unauthorized use of the duplicated information code C can be prevented without requiring communication with an external device such as a server. In particular, in the reader 30, since the terminal tilt state is estimated on the basis of the distortion in the image of the information code C acquired by the imaging unit 33, a sensor or the like for detecting the tilt state of the mobile terminal 20 or the reading surface 39 can be omitted to thereby simplify the reader 30 and reduce the cost.

Figure 11:
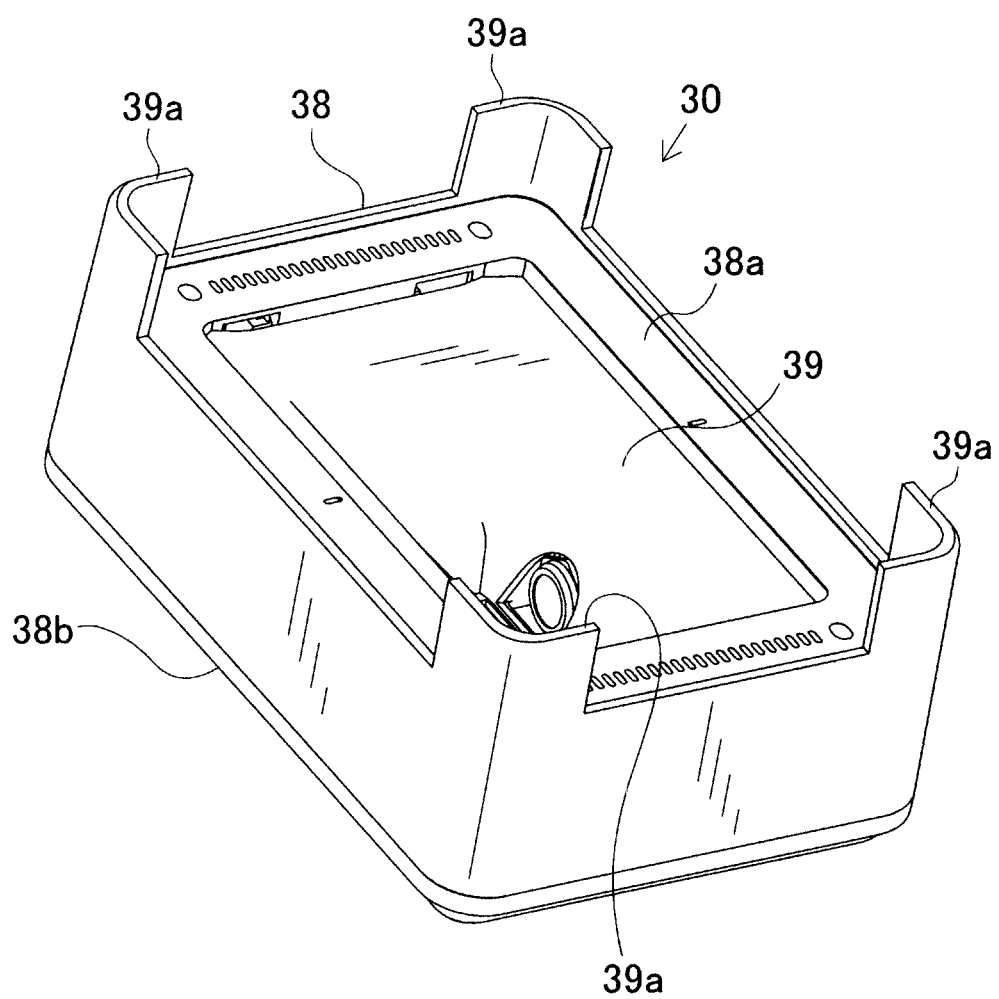
FIG. 11 is a perspective view of a reader having a wall surrounding a reading surface from four corners thereof.

Further, in order to limit the positional relationship between the display screen 24a of the mobile terminal 20 and the reading surface 39 of the reader 30, as illustrated in FIG. 11, a wall 39a may be provided on the upper surface 38a of the housing 38 of the reader 30 so as to surround the reading surface 39 from four corners. Since the wall 39a functions as a guide when the display screen 24a of the mobile terminal 20 is brought closer to and face the reading surface 39, the display screen 24a is readily guided to a position immediately above the reading surface 39, which is suitable for reading. Accordingly, the positional relationship between the display screen 24a and the reading surface 39 can be readily limited to the position suitable for reading.

Further, the wall 39a is not limited to being formed to surround the reading surface 39 from four corners thereof, and, for example, may be formed in an annular shape surrounding around the reading surface 39, or may be formed to surround the reading surface 39 from three corners except for one on the user's side.

Sixth Embodiment

Next, an information code reading system according to a sixth embodiment will be described with reference to the drawings.

The sixth embodiment mainly differs from the fifth embodiment in that, after the estimated terminal tilt state and the read terminal tilt state indicate the same tilt state in reading the information code, processing using the predetermined information that is read is performed when the estimated terminal tilt state and the read terminal tilt state indicate the same tilt state in reading another information code.

In the reading procedure of the present embodiment, in order to reliably prevent unauthorized use of the duplicated information code C, after it is determined that the estimated terminal tilt state and the read terminal tilt state indicate the same tilt state, it is waited until a state where different terminal tilt state is estimated. When it is determined that this different terminal tilt state and a newly read terminal tilt state indicate the same tilt state, processing using the authentication information (predetermined information) that is read is performed.

Figure 12:
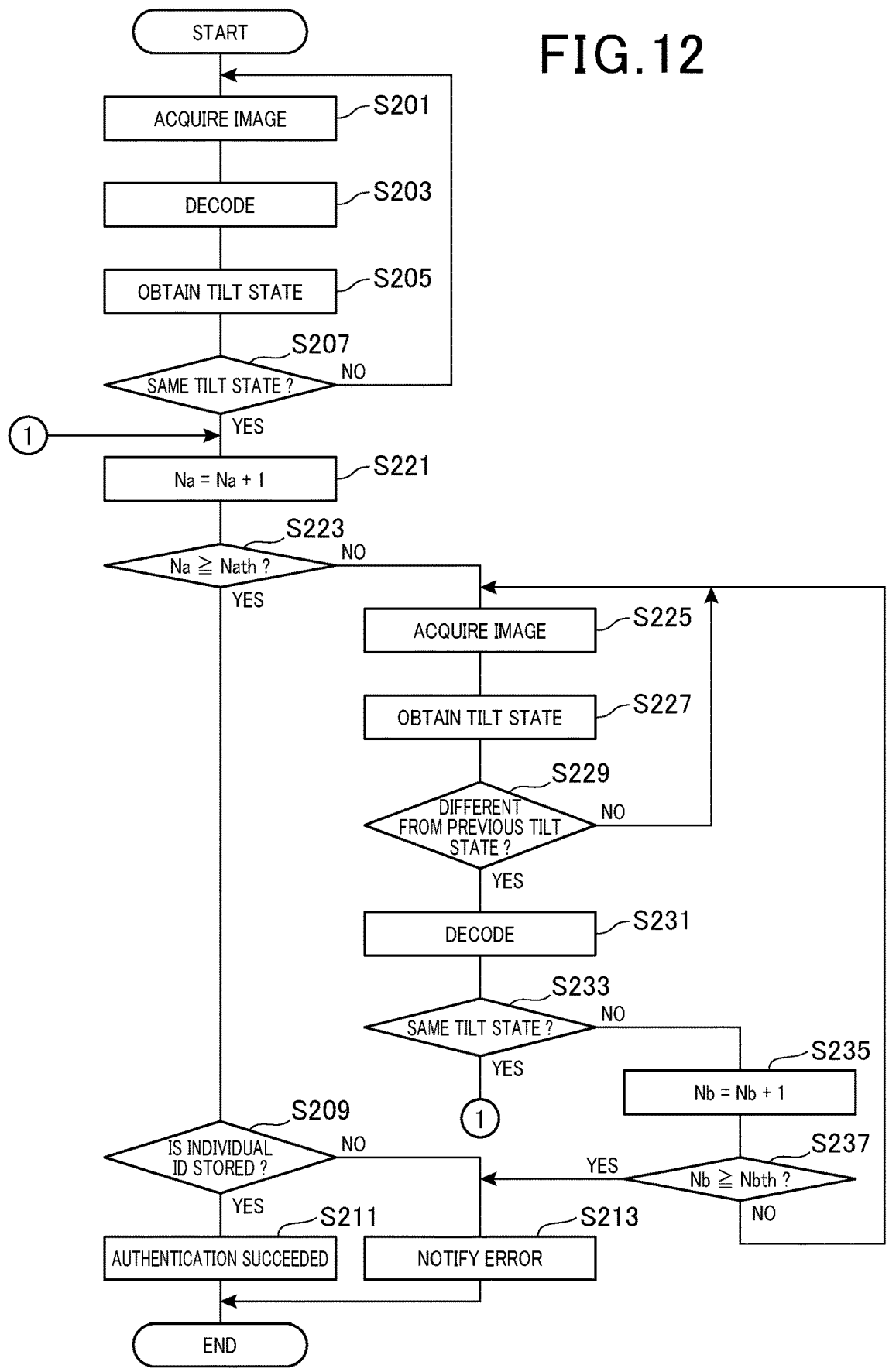
FIG. 12 is a flowchart showing a flow of a reading procedure performed by a reader in a sixth embodiment.

Next, with reference to the flowchart shown in FIG. 12, the reading procedure performed by the reader 30 in the sixth embodiment will be described in detail.

As in the fifth embodiment, when it is determined that the terminal tilt state estimated in the above tilt state obtaining (S205 in FIG. 12) and the terminal tilt state read in the above decoding (S203) indicate the same tilt state (Yes in S207), the number of positive determination Na indicating the number of times that the estimated terminal tilt state and the read terminal tilt state are determined to indicate the same tilt state is incremented (Na=Na+1) (S221).

Then, at step S223, determination is performed whether or not the number of positive determination Na is equal to or greater than a predetermined threshold Nath. When the estimated terminal tilt state and the read terminal tilt state indicate the same tilt state for the first time, it is determined as 'No_ at step S223, and imaging of the information code C is again performed (S225). Then, as in the above tilt state obtaining, a terminal tilt state is estimated and obtained from the acquired image of the information code C (S227). Subsequently, at step S229, determination is performed whether or not the terminal tilt state currently estimated and the terminal tilt state previously estimated are different tilt states. Here, when the terminal tilt state currently estimated and the terminal tilt state previously estimated are the same tilt state, it is determined as `No_ at step S229 since the mobile terminal 20 is in a stationary state and the screen tilt angle ≠a is hardly changed. Then, the steps from step S225 onward are repeated.

When the tilt of the information code C relative to the reader 30 changes, and thus it is determined that the terminal tilt state currently estimated and the terminal tilt state previously estimated are different tilt states (Yes in S229), the information code C that has been acquired at step S225 is decoded (S231). Then, at step S223, determination is performed whether or not the terminal tilt state estimated in step S227 and the terminal tilt state read in S231 indicate the same tilt state.

Here, in imaging of the information code C displayed on the display screen 24a, the terminal tilt state that has been changed is recorded in the information code. Accordingly, it is determined that the estimated terminal tilt state and the read terminal tilt state indicate the same tilt state (Yes at S233), and the number of positive determination Na is incremented (Na=Na+1) (S221). Then, after it is determined that the terminal tilt state currently estimated and the terminal tilt state previously estimated are different tilt states, as the determination indicating that the terminal tilt state currently estimated and the terminal tilt state that is read indicate the same tilt state is repeatedly performed, the number of positive determination Na becomes equal to or greater than the predetermined threshold Nath (Yes at S223). Accordingly, the steps from step S209 onward are repeated.

On the other hand, when an illegally duplicated information code C is imaged, since the terminal tilt state that has been changed is not recorded in the information code C, it is determined that the estimated terminal tilt state and the read terminal tilt state indicate different tilt states (No at S233). In this case, the number of negative determination Nb indicating the number of times that the estimated terminal tilt state and the read terminal tilt state are determined as indicating different tilt states is incremented (Nb=Nb+1) (S235).

Then, at step S237, determination is performed whether or not the number of negative determination Nb is equal to or greater than a predetermined threshold Nbth. When the estimated terminal tilt state and the read terminal tilt state indicate different tilt states for the first time, it is determined as `No_ at step S237, and imaging of the information code C is again performed (S225). Thereafter, determination indicating that the estimated terminal tilt state and the read terminal tilt state indicate different tilt states is repeated, and, when the number of negative determination Nb becomes equal to or greater than the Nbth (Yes in S237), processing of step S213 is performed. Accordingly, the authentication does not succeed, and error notification is performed by using display or the like by the display unit 34.

As described above, in the information code reading system 10 of the present embodiment, the information code C is generated each time the terminal tilt state detected by the terminal environment state detecting unit 26 changes. Then, when it is determined that the terminal tilt state estimated in reading of the information code C by the reader 30 and the terminal tilt state that is read indicate the same tilt state, and thereafter it is determined that the terminal tilt state estimated in reading of another information code C and the terminal tilt state that is read indicate the same tilt state for a predetermined number of times, the control unit performs processing using the determination information (predetermined information) that has been read by the reader 30.

With this configuration as well, as in the second embodiment, unauthorized use of the duplicated information code C can be more reliably prevented.

The present invention is not limited to the aforementioned embodiments and modifications, and for example may be embodied as described below.

(1) In the mobile terminal 20, the information code C is not limited to being generated in which the detected terminal tilt state described above is recorded in addition to the predetermined information such as determination information. It is also possible to generate the information code C such that the angular range specified from the tilt angle of the short axial direction of the display screen 24a that displays the information code C relative to the horizontal plane F, or the angular range specified from the tilt angle of the plane containing both the longitudinal axial direction and short axial direction relative to the horizontal plane F may also be recorded therein as the terminal environment state in addition to the predetermined information such as determination information. Further, in the mobile terminal 20, the information code C may also be generated such that at least one of the state of the mobile terminal 20 and the state around the mobile terminal 20, which is different from the screen tilt angle ≠a, is recorded therein as another terminal environment state, in addition to the predetermined information such as determination information. For example, the orientation range of the mobile terminal 20 detected by geomagnetic information, or the range of light, sound, atmospheric pressure, or humidity around the mobile terminal 20 may be used. In this case, the terminal environment state detecting unit 26 is configured to detect the above terminal environment state, and the reading surface environment state detecting unit 36 of the reader 30 is configured to detect the corresponding reading surface environment state. With this configuration as well, when it is determined that the reading surface environment state detected by the reading surface environment state detecting unit 36 in reading of the information code C by the reader 30 and the terminal environment state that is read from the information code C indicate the same environment state, the control unit 31 performs processing using the predetermined information that has been read. Accordingly, the same effect as that of the first embodiment is achieved.

Further, in the mobile terminal 20, the information code C may also be generated such that both the above-mentioned another terminal environment state detected and the terminal tilt state are recorded therein in addition to the predetermined information such as determination information. With this configuration, two or more environment states including the tilt state are detected at each of the mobile terminal 20 and the reading surface 39. Accordingly, when an illegally duplicated information code C is held over the reading surface 39, the reading surface environment state detected by the reading surface environment state detecting unit 36 and the terminal environment state read by the reader 30 are not likely to indicate the same environment state, compared with a case where one environment state is detected. Thus, unauthorized use of the duplicated information code C can be reliably prevented.

(2) In the mobile terminal 20, the information code C may also be generated such that the generation time at which the information code C was generated is recorded therein in addition to the terminal environment state and the predetermined information. In this case, in the reader 30, the control unit 31 may perform processing using the predetermined information that has been read when it is determined that the reading surface environment state detected by the reading surface environment state detecting unit 36 in reading of the information code C and the terminal environment state that is read indicate the same environment state, and when the time at which the information code C was read is not the time after a predetermined period of time has elapsed from the generation time at which the information code C was read.

(3) In the above code display procedure, in order to make it difficult for a third party to know that the information code C displayed on the display screen 24*a* changes with a change in the terminal tilt state of the mobile terminal 20, the information code C can be set so as not to be displayed when the display screen 24*a* faces the user (upward), not to the reading surface (downward). Further, as illustrated in FIG. 2, when the respective information codes C are generated to have the same code type and the same code size, the same effect is also achieved.

(4) The information code reading system 10 according to the present invention is not limited to being adopted for a system that uses the information code C displayed on the mobile terminal 20 as an admission ticket, and may also be adopted for a system that uses the information code C displayed on the mobile terminal 20 for other authentication or the like.

DESCRIPTION OF PARTIAL REFERENCE SIGNS

10ŭ information code reading system
20ŭ mobile terminal
21ŭ control unit (terminal-side detecting unit, generation unit)
24ŭ display unit
24*a*ŭ display screen
26ŭ terminal environmental state detecting unit (terminal-side detecting unit)
30ŭ reader
31ŭ control unit (reading unit, determination unit, processing unit, estimation unit)
32ŭ storage unit
33ŭ imaging unit (reading unit)
36ŭ reading surface environmental state detecting unit (reader-side detecting unit)
39ŭ reading surface
40ŭ pedestal
41ŭ tilt surface
50ŭ
53*a*ŭ tilt surface
C, C1-C5ŭ information code
Fŭ horizontal plane

The invention claimed is:
1. An information code reading system comprising:
a mobile terminal comprising:
a terminal sensor configured to detect, as a terminal environmental state, at least one of a state of the mobile terminal or a state around the mobile terminal;
a terminal processor programmed to generate an information code such that the terminal environmental state, detected by the terminal sensor, and predetermined information are recorded in the information code; and
a screen configured to display the information code; and
a reader comprising:
an imager provided with a reading surface and configured to image the information code held over the reading surface;
a reader sensor configured to detect a reading surface environmental state corresponding to the terminal environmental state, the reading surface environmental state being at least one of a state of the reading surface or a state around the reading surface; and
a reader processor programmed to:
read both the terminal environmental state and the predetermined information from the information code imaged by the imager;
determine whether or not both the reading surface environmental state and the terminal environmental state are a same environmental state; and
perform processing based on the predetermined information when it is determined that the reading surface environmental state and the terminal environmental state are the same environmental state.

2. The information code reading system of claim 1, wherein
the predetermined information to be recorded in the information code is authentication information,
the reader comprises a memory, information corresponding to the authentication information being stored in the memory, and
the reader processor is programmed to perform, as the processing, authentication processing based on the authentication information when it is determined that the reading surface environmental state and the terminal environmental state are the same environmental state and the information corresponding to the authentication information is stored in the memory.

3. The information code reading system of claim 2, wherein
the terminal sensor is configured to detect, as the terminal environmental state, a tilt state of the mobile terminal relative to a horizontal plane,
the reader sensor is configured to detect, as the reading surface environmental state, a tilt state of the reading surface relative to the horizontal plane, and
the reader processor is programmed to:
determine whether or not the tilt state of the reading surface detected by the reader sensor and the tilt state of the mobile terminal by the reader indicate the same tilt state when the reader reads the information code, and
perform the processing based on the predetermined information when it is determined that the tilt state of the reading surface and the tilt state of the mobile terminal are the same tilt state.

4. The information code reading system of claim 3, wherein the terminal processor is programmed to generate the information code every time when the tilt state of the mobile terminal detected by the terminal sensor changes stepwise, and the reader processor is programmed to perform the processing based on the predetermined information, when i) it is determined that the tilt state of the reading surface detected by the reader sensor and the tilt state of the mobile terminal read by the reader are the same tilt state, ii) and then, in a case where the reader reads a second information code different from the information code, it is determined that the tilt state of the reading surface detected by the reader sensor and the tilt state of the mobile terminal are the same tilt state.

5. The information code reading system of claim 2, wherein the terminal sensor is configured to detect, as the terminal environmental state, both the tilt state of the mobile terminal and at least one of a state of the mobile terminal which differs from the tilt state of the mobile terminal or the state around the mobile terminal;

the reader sensor is configured to detect, as the reading surface environmental state, both i) the tilt state of the reading surface and ii) a state corresponding to the terminal environmental state among the state of the reading surface which differs from the tilt state of the reading surface and the state around the reading surface; and the reader processor is programmed to:
 determine whether or not the reading surface environmental state read by the reader sensor and the terminal environmental state read by the reader are the same environmental state when the reader reads the information code; and
 perform the processing based on the predetermined information when it is determined that the reading surface environmental state and the terminal environmental state are the same environmental state.

6. The information code reading system of claim 1, wherein the terminal sensor is configured to detect, as the terminal environmental state, a tilt state of the mobile terminal relative to a horizontal plane, the reader sensor is configured to detect, as the reading surface environmental state, a tilt state of the reading surface relative to the horizontal plane, and the reader processor is programmed to:
 determine whether or not the tilt state of the reading surface and the tilt state of the mobile terminal are a same tilt state when the reader reads the information code, and
 perform the processing based on the predetermined information when it is determined that the tilt state of the reading surface and the tilt state of the mobile terminal indicate the same tilt state.

7. The information code reading system of claim 6, wherein the terminal processor is programmed to generate the information code every time when the tilt state of the mobile terminal detected by the terminal sensor changes stepwise, and the reader processor is programmed to perform the processing based on the predetermined information, when i) it is determined that the tilt state of the reading surface and the tilt state of the mobile terminal are the same tilt state, ii) and then, in a case where the reader reads a second information code different from the information code, it is determined that the tilt state of the reading surface and the tilt state of the mobile terminal are the same tilt state.

8. The information code reading system of claim 1, wherein the terminal sensor is configured to detect, as the terminal environmental state, both the tilt state of the mobile terminal and at least one of a state of the mobile terminal which differs from the tilt state of the mobile terminal and the state around the mobile terminal;

the reader sensor is configured to detect, as the reading surface environmental state, both i) the tilt state of the reading surface and ii) a state corresponding to the terminal environmental state among the state of the reading surface which differs from the tilt state of the reading surface and the state around the reading surface; and the reader processor is programmed to:
 determine whether or not the reading surface environmental state and the terminal environmental state are the same environmental state when the reader reads the information code; and
 perform the processing based on the predetermined information when it is determined that the reading surface environmental state and the terminal environmental state are the same environmental state.

9. The information code reading system of claim 1, wherein the reader includes a wall which surrounds the reading surface.

10. An information code reading system comprising:
 a mobile terminal comprising:
  a terminal sensor configured to detect a tilt state of the mobile terminal relative to a horizontal plane;
  a terminal processor programmed to generate an information code such that the tilt state of the mobile terminal, detected by the terminal sensor, and predetermined information are recorded in the information code; and
  a screen configured to display the information code; and
 a reader comprising:
  an imager provided with a reading surface and configured to image the information code held over the reading surface;
  a memory, a tilt state of the reading surface relative to the horizontal plane being previously stored in the memory; and
  a reader processor programmed to:
   read both the tilt state of the mobile terminal and the predetermined information from the information code imaged by the imager;
   determine whether or not both the tilt state stored in the memory and the tilt state of the mobile terminal are a same tilt state; and
   perform processing based on the predetermined information when it is determined that the tilt state of the reading surface and the tilt state of the mobile terminal are the same tilt state.

11. An information code reading system comprising:
 a mobile terminal comprising:
  a terminal sensor configured to detect a tilt state of the mobile terminal relative to a horizontal plane;
  a terminal processor programmed to generate an information code such that the tilt state of the mobile terminal, detected by the terminal sensor, and predetermined information are recorded in the information code; and a screen configured to display the information code; and a reader comprising:

an imager provided with a reading surface and configured to image the information code held over the reading surface; and a reader processor programmed to:

read both the tilt state of the mobile terminal and the predetermined information from the information code imaged by the imager;

estimate the tilt state of the mobile terminal based on distortion of the information code imaged by the imager;

determine whether or not the estimated tilt state of the mobile terminal and the tilt state of the mobile terminal read by the reader are a same tilt state when the reader reads the information code; and perform processing which uses the predetermined information when it is determined that the estimated tilt state of the mobile terminal and the tilt state of the mobile terminal read by the reader are the same tilt state.

12. The information code reading system of claim 11, wherein the terminal processor is programmed to generate the information code every time when the tilt state of the mobile terminal detected by the terminal sensor changes stepwise, and the reader processor is programmed to perform the processing which uses the predetermined information, when i) it is determined that the estimated tilt state of the mobile terminal and the tilt state of the mobile terminal read by the reader are the same tilt state, ii) and then, in a case where the reader reads a second information code different from the information code, it is determined that the tilt state of the estimated mobile terminal and the tilt state of the mobile terminal read by the reader are the same tilt state.

13. A reader which acquires predetermined information by optically reading an information code displayed on a screen of a mobile terminal, the mobile terminal being configured to detect, as a terminal environmental state, at least one of a state of the mobile terminal or a state around the mobile terminal; to generate the information code, the detected terminal environmental state, and the predetermined information being recorded in the information code; and to display the generated information code, the reader comprising:

an imager provided with a reading surface and configured to image the information code held over the reading surface;

a reader sensor configured to detect a reading surface environmental state corresponding to the terminal environmental state, the reading surface environmental state being at least one of the state of the reading surface or the state around the reading surface; and a reader processor programmed to:

read both the terminal environmental state and the predetermined information from the information code imaged by the imager;

determine whether or not both the reading surface environmental state and the terminal environmental state are the same environmental state when the reader reads the information code; and perform processing based on the predetermined information read by the reader when it is determined that the reading surface environmental state and the terminal environmental state are the same environmental state.

* * * * *